United States Patent
Groetzner et al.

(10) Patent No.: US 6,704,753 B1
(45) Date of Patent: Mar. 9, 2004

(54) METHOD OF STORAGE MANAGEMENT IN DOCUMENT DATABASES

(75) Inventors: Michael Groetzner, Stuttgart (DE); Udo Guenthner, Leonberg (DE); Heinrich Streckeisen, Wettwiel (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/235,457

(22) Filed: Jan. 22, 1999

(30) Foreign Application Priority Data

Jan. 29, 1998 (DE) .......................... 198 03 276

(51) Int. Cl.⁷ ............................................. G06F 17/30
(52) U.S. Cl. ..................... 707/204; 707/202; 711/162
(58) Field of Search .................. 707/4–6, 200–206; 711/162, 173, 4–6

(56) References Cited

U.S. PATENT DOCUMENTS

| | | | | |
|---|---|---|---|---|
| 4,814,971 A | * | 3/1989 | Thatte | 714/15 |
| 4,899,299 A | * | 2/1990 | MacPhail | 707/204 |
| 5,008,786 A | * | 4/1991 | Thatte | 711/162 |
| 5,276,867 A | * | 1/1994 | Kenley et al. | 707/204 |
| 5,355,475 A | * | 10/1994 | Tanaka et al. | 707/205 |
| 5,537,585 A | * | 7/1996 | Blickenstaff et al. | 707/205 |
| 6,157,930 A | * | 12/2000 | Ballard et al. | 707/203 |
| 6,266,679 B1 | * | 7/2001 | Szalwinski et al. | 707/204 |

* cited by examiner

*Primary Examiner*—Shahid Alam
*Assistant Examiner*—Jean Bolte Fleurantin
(74) *Attorney, Agent, or Firm*—John E. Campbell; Marc A. Ehrlich; Floyd A. Gonzalez

(57) ABSTRACT

A method of storage management in document databases wherein residence times are assigned to individual documents on entry to the database. Two different residence times are preferably assigned to the document. The first residence time (residual time) is defined as the time span between storage of the document in the document management system (DMS) and the time at which the document may be relocated for the first time. The second residence time (keep time) is defined as the time span between recall of the relocated document to the DMS and time at which it may be relocated again. A further feature of the invention subsists in the fact that the second residence time is only stipulated if the document is recalled to the first storage means following relocation. Assignment of the residual and keep time is effected on entry of the document into the DMS. Residence times can be assigned by the user or also by a program.

45 Claims, 4 Drawing Sheets

METHOD OF STORAGE MANAGEMENT IN DOCUMENT DATABASES

FIELD OF THE INVENTION

The present invention describes a method of storage management in document databases.

BACKGROUND OF THE INVENTION

In banks and insurance companies, thousands of documents are handled daily. In the case of banks, transfers and account withdrawal documents are most common; with regard to insurance companies, it is principally policies or claims. To be able to access and search these documents, they are usually filed in databases. The period in which these documents have to be accessible in the databases is determined chiefly by the type of the documents. As well as purely operational requirements, statutory regulations also exist regarding the period for which documents are kept. Since the quantity of data (quantity of documents) e.g. in banks and insurance companies, is constantly increasing over time and since existing databases cannot manage these increasing quantities of data, organisation into logical storage areas has become established as a leading concept for document management. This concept specifies that the entire logical storage area available (which may also extend over several systems) is divided up into storage segments, each individual storage segment only being able to hold one type of document defined by the user. If the relevant storage segment is full, this segment is closed for the receipt of further documents and a new segment is created for this type of document (see FIG. 1). This concept is described in greater detail in the published PCT application WO 97/16794 of the applicant.

In theory, an unlimited number of documents can be filed by means of this concept.

Normally, the documents put in the segments are filed first on the fast hard disk (part of the logical storage area). Owing to their speed, hard disks of this kind are relatively expensive. Modern computer systems therefore feature storage management systems (SMS), such as DFSMS by IBM, for example, which relocate files which have not been used for a fairly long time to slower and less expensive storage media, e.g. data tapes. If one of the relocated documents is to be accessed again, this is ascertained by the SMS, and it makes sure that the data are transferred from the data tapes back to the fast hard disks (recall). A process of this kind takes a relatively long time. It may take a few seconds to several minutes.

The document management systems currently available on the market, e.g. VisualInfo or OnDemand (R/DARS), manage a restricted storage space, similar to the situation with the main storage space in a computer system. This means that all documents are first collected in a database (document pool). Once this segment is full, either completely or to a certain degree, the segment is relocated to another storage medium, e.g. magnetic tapes or CDs.

Information on which elements have been relocated and which segments they are in is managed by the pertinent document management system (DMS). If a document is sought in the DMS, this establishes whether it is in the segment which it can access directly. If not, it looks in its management information to see which relocated, packed segment the document is in and procures this document. This packed segment is then read into a temporary storage space and the document sought is procured. If another document is then sought, the temporary storage space is released and occupied by the new documents. A temporary storage space of this kind may be a database, as in the case of OnDemand, or a CD drive, as for VisualInfo.

Documents which have already been found are then always deleted from the temporary storage space if other documents which have been relocated are sought.

The disadvantage of these systems is that no special access features to the document are taken into account. The documents are normally stored in order to be able perhaps to find them again one day and reproduce them. However, in this regard certain documents have different access periods and access probabilities, e.g. bank transfers are searched for normally for a maximum of 6 weeks, as banks have a corresponding appeal period for customers. For other documents, such as loan extensions, which sometimes run for months and are being constantly added to, searches for these documents are conducted in these time spans. Since the recall of relocated documents takes a relatively long time compared with accessing documents which are still in a segment, it is a disadvantage for all documents to be treated in the same way on relocation. The disadvantage here is that all documents are treated in the same way and that the criterion for relocation is the size and availability of an existing, equally large space.

It is similarly the case for documents which, following relocation, have been recalled. Some documents only need to remain stored for a short period, while in the case of other documents longer periods are required in which they should be available on-line. This is due to the fact that they will in all probability be re-accessed in a certain time period.

In the previous example of the bank, it is usually the case that transfers are only recalled briefly in order to reproduce them so that they can be used as evidence in relation to customers. In contrast, processes normally take longer in the case of loan applications. One has in mind here loan extensions which, with corresponding negotiations over interest rates and possible counter-offers obtained by a customer from competitors, normally extend over several weeks.

SUMMARY OF THE INVENTION

The object of the present invention is to provide a method of document management which avoids the aforementioned disadvantages.

This invention is achieved by the features of claim 1. Further advantageous forms of execution of the invention are set out in the sub-claims.

The essential advantages of the invention lie in the fact that the documents are found faster. Time and money are saved hereby. Lower-cost storage means can be used due to the relocation of documents. The total quantity of expensive storage means is hereby reduced. The residence period of the document in a storage means can be determined individually for each document by the user. However, the residence period can also be determined by a program, which calculates the access frequency for documents or document types and establishes the residence period according to this.

BRIEF DESCRIPTION OF THE DRAWINGS

The present invention is explained in greater detail with reference to a preferred practical example, in which.

DETAILED DESCRIPTION OF THE DRAWINGS

Figure 2:
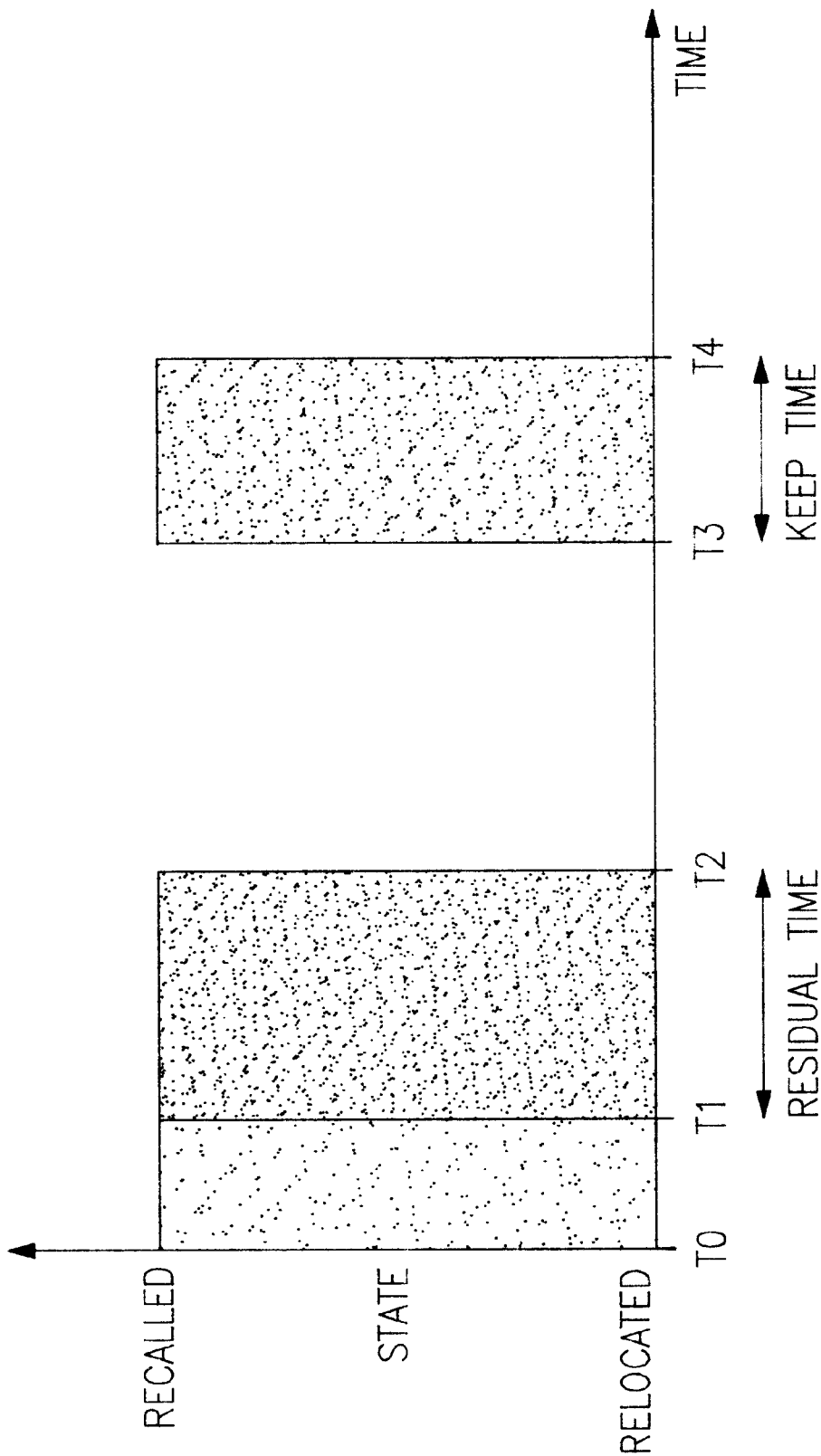
FIG. 2 shows a state-time diagram of a segment according to FIG. 1.

FIG. 2 shows a state diagram, which represents the individual residence times of a document.

The idea of the present invention subsists in the fact that residence times are assigned to the individual documents. Two different residence times are preferably assigned to the document. The first residence time (residual time) is defined as the time span between storage of the document in the DMS and the time at which the document may be relocated for the first time. The second residence time (keep time) is defined as the time span between recall of the document to the DMS and the time at which it may be relocated again. A further configuration of the present invention subsists in the fact that the second residence time is only stipulated if the document is recalled to the first storage means.

The residual and keep times are assigned on entry of the document into the DMS. This assignment can be effected via several mechanisms, which are described here by way of example:

The times are assigned by the user who files the document in the DMS. This user can either assign these times entirely freely or receives suggested limited time spans set by the system between which he can choose.

The times are laid down by a manager on description of the document type in the DMS. These times are assigned to each document of this document type which newly enters the DMS. The length of the keep and residual times is laid down by a manager on the basis of empirical values or operational or statutory requirements.

Another option would be for the DMS to calculate statistics regarding access probabilities and access frequencies on the basis of actual accessing and then assign these to new documents or the document type.

The classification of keep and residual times can either be assigned directly in the document, remain as a classification according to the description of the document type in the DMS or be given externally to the storage medium in which the document is filed. On entry of the document into the DMS, its state is designated as "stored".

Figure 1:
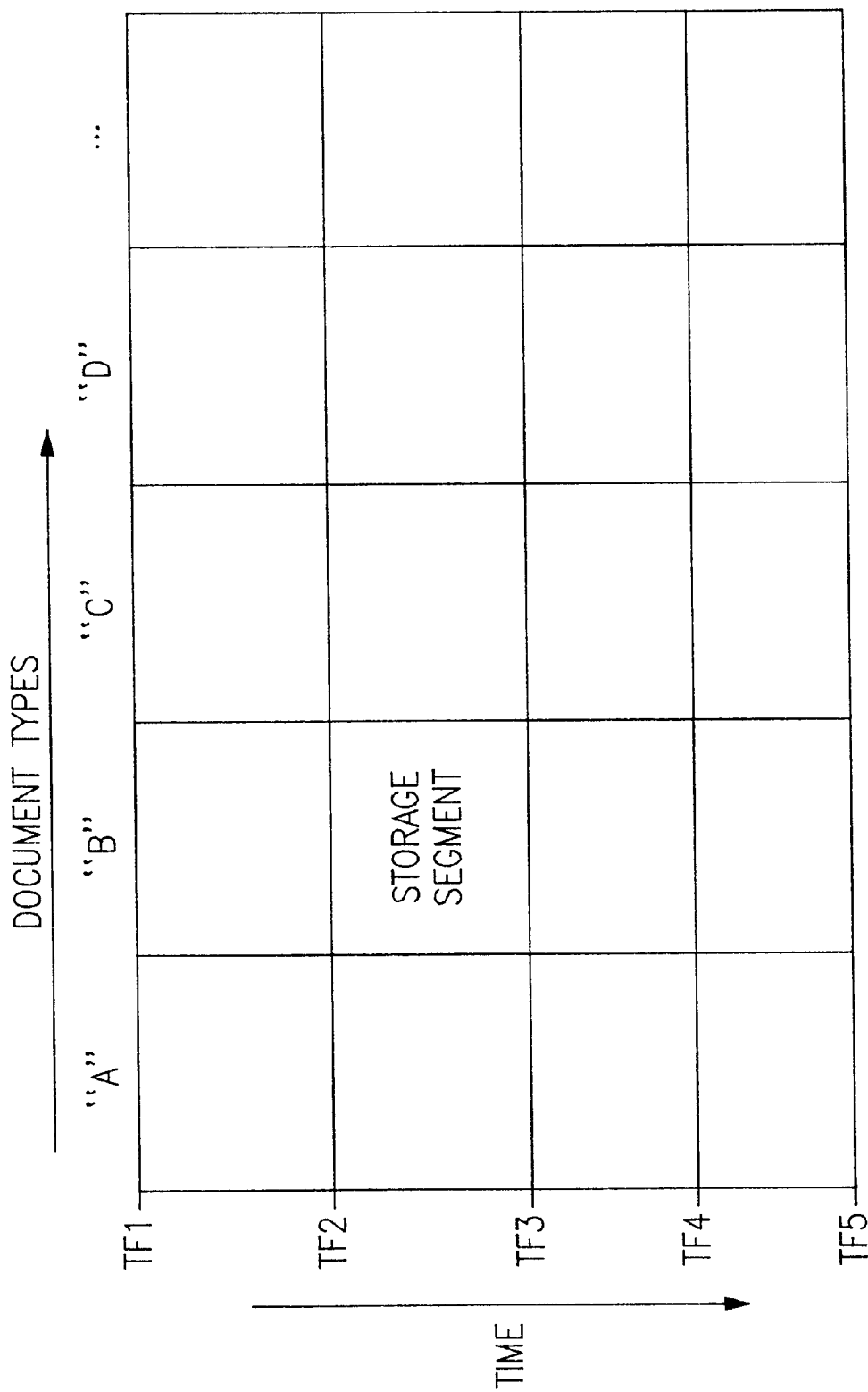
FIG. 1 shows a logical storage area with segment division.

The residual time will preferably commence for a document at the time of entry into the DMS (T0). For administrative reasons, this starting time can however also be the start and end time of the segment (e.g. segment "B", TF 2–TF 3, see FIG. 1) or a time calculated according to mathematical viewpoints (e.g. arithmetic means) between the start and end time of the relevant segment.

If a document is accessed during the residual time, the start time of the residual time can either remain unchanged or can be brought forward to the time of the last access.

The document is then relocated only on expiry of the residual time. This relocation can be carried out in accordance with several criteria or types of management. Each document is fetched individually from a segment of the logical storage area and relocated once the residual time (T2) has expired. To do this, a program which performs this relocation must be started at this time. This can either take place in a timed manner on expiry of the residual time, or this program is started regularly (e.g. once a day) and checks whether the residual time has expired for documents. This program can either be part of the DMS or of an external program, for example a storage management program (SMS) such as already exists for larger computer systems (example: DFSMS with HSM for IBM OS/390). The documents can be relocated singly, all together or according to document type. On relocation of the documents, the document can then either be removed completely from the database and stored in another form, due to which the type of access to this document may change, or the files in which the documents are filed are relocated and the form and access method remain unchanged.

Files can be relocated singly, all together or according to various criteria (e.g. index data, content data).

If the documents are then relocated, their state is then designated as "relocated". Relocation can also take place asynchronously to the DMS. In this case, the DMS can establish whether a document or a segment with documents has been relocated and enter this in its management information. This is effected by information from the SMS to the DMS or interrogation of the SMS by the DMS or by the DMS attempting to access these documents and in doing so receiving a resulting value which tells it that the documents are no longer present through direct access.

Figure 3:
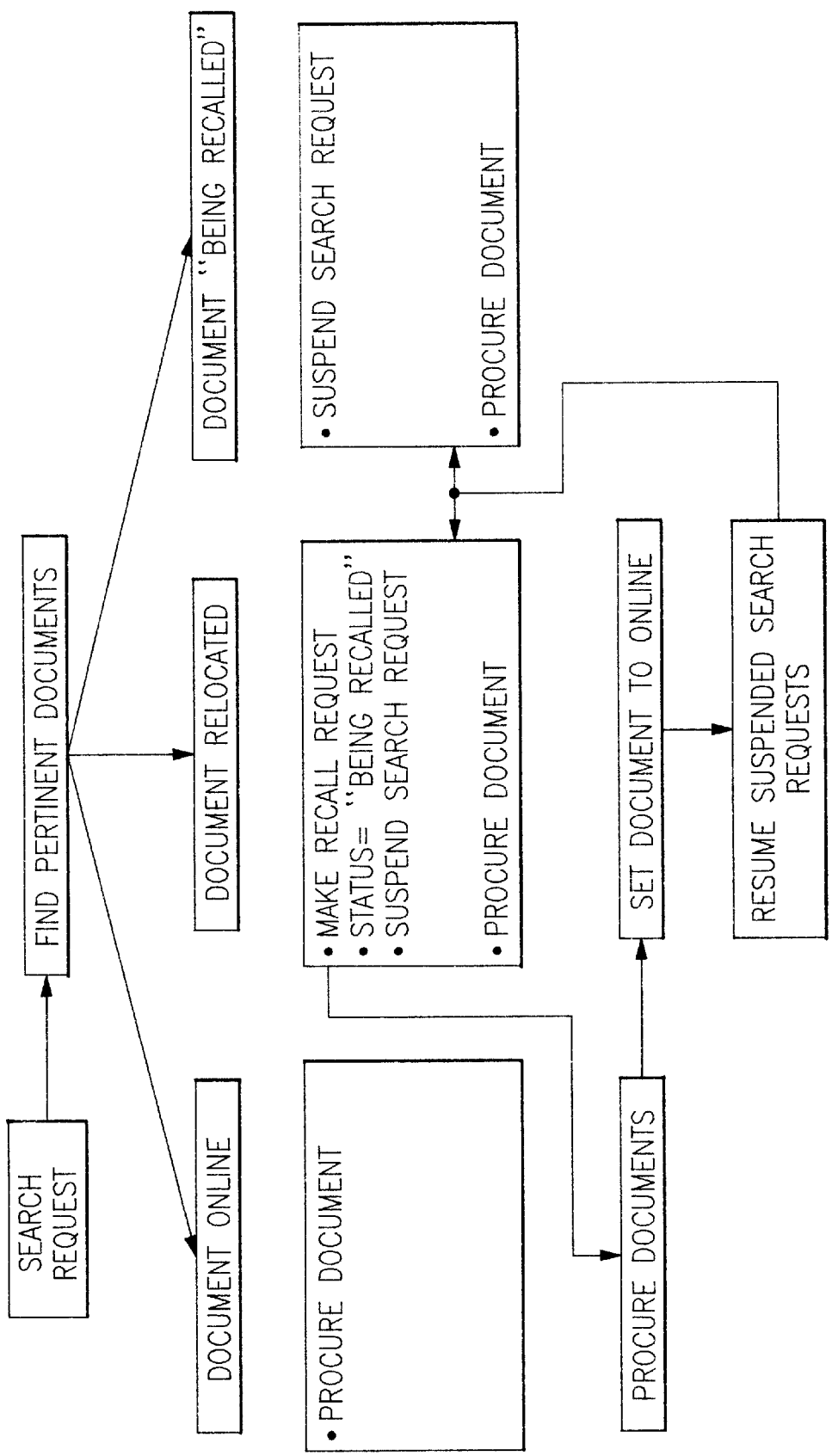
FIG. 3 shows a flow diagram of a search in a document management system with storage management according to the present invention.

FIG. 3 shows a flow diagram of a search in a document management system with the inventive storage management.

Figure 4:
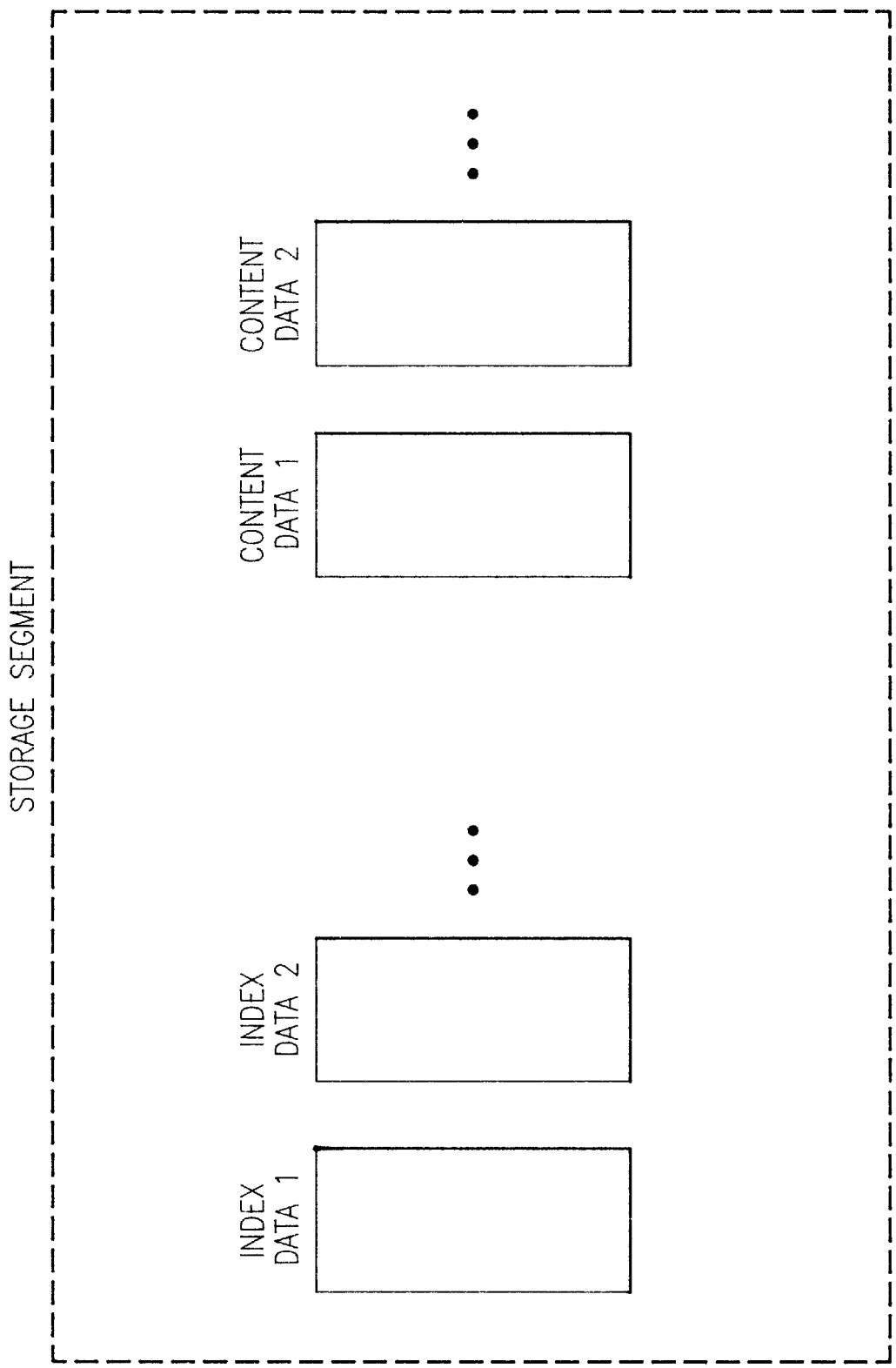
FIG. 4 shows a structure of an exemplary storage segment according to the present invention.

If the DMS receives a search request for documents, it establishes with reference to its management information whether this document is still directly accessible or whether it has already been relocated. If it is still directly accessible, the document is sought and procured entirely normally. If a document is sought which is no longer directly accessible, the document first has to be procured. As described in the patent referred to, documents can be separated into profile information and document contents (see FIG. 4). Profile information is information which can be used to find documents again. Document contents on the other hand are the actual documents, e.g. the image of a transfer. In a search for a document which has been relocated, therefore, either the complete documents concerned can be recalled, or for the search only the profile information may be recalled. The document contents can then be procured once it is established that a document also has to be procured for a request. Since, as described above, documents are relocated mostly in segments, these segments have to be recalled. This can either be done synchronously with processing of the search request or asynchronously by writing a procurement request and inactivating the search request for its period of execution. In this case, it is also possible to directly call the program which is to undertake the recall, or this program can be started in a timed manner.

Since recall takes a relatively long time, at least several seconds, but mostly several minutes, an interim state can be assigned to the state of the documents or the segments with documents, e.g. "being recalled". It is achieved thereby that other search requests relating to the same document or the same segments with documents do not have to write any further recall request, but can be inactivated immediately until the documents have been recalled.

Once the documents have been procured, the state of the documents concerned is changed from "relocated" or "being recalled" to "recalled". The documents thus become directly accessible to the DMS once more.

The requests which were inactivated due to documents or segments with documents having been relocated can now be reactivated. This can be performed directly by the program which executed the recall request or is effected in a timed manner, so that the search request is activated at certain intervals and it is checked whether the recall request has been executed.

The keep time commences at the time of recall of the document. As already described, it can be assigned fixedly to the document on introduction of the document or is assigned to the document only at the time of recall. This can be carried out with reference to a fixedly defined or calculated value, as already described in the case of residual time. The document can now be searched for in the context of the search request or the document be resupplied.

If during the keep time this document or segment with the documents is accessed once again in the context of document search requests, the keep time can be started anew or runs out at the first calculated end time.

On the expiration of the keep time, the document is then relocated in the same process as already effected on expiration of the residual time.

Having thus described our invention, what we claim as new and desire to secure by Letters Patent is:

1. A method of managing document files in a data processing system, the method comprising the steps of:
    holding a first document file of a document comprising one or more document files, in a first storage means;
    determining a residence time (residual time) value wherein the residence time value is the time span between storage of the first document file in a second storage means and the time at which the first document file may be relocated to the first storage means;
    assigning the residence time value to the first document file;
    relocating the first document file to the second storage means wherein the time of relocating a document file to the second storage means marks the beginning of the residence time; and
    permitting the first document file to be moved from the second storage means after the expiration of the time span specified by the residence time value.

2. Method according to claim 1, characterized in that the second storage means is any one of a slower or lower-priced storage means.

3. Method according to claim 1, characterized in that the first storage means is a hard disk and the second storage means is a magnetic tape.

4. Method according to claim 1, characterized in that the first storage means can be accessed directly.

5. Method according to claim 1, characterized in that the data processing system contains a number n of storage means and a residence period is assigned to the document on storage to any of said n means of storage.

6. Method according to claim 1, characterized in that on storage of the document, a further residence time (keep time) in the first storage means is assigned, which is only activated on re-storage of the first document file in the first storage means from said second storage means.

7. Method according to claim 1, characterized in that subsequent to said relocating step, access to the first document file is implemented by recalling the first document file to the first storage means, the original residence time or a new residence time in the first storage system being assigned to the recalled first document file.

8. Method according to claim 1, characterized in that the residence time is stipulated either within the document, within a description of the document type in the database, or within a file in the storage means.

9. Method according to claim 1, characterized in that the residence time is stipulated by a user of the data processing system or by a user who files the document in the database, or by a user who describes the type of document in the database, or by a program which calculates the residence time from an access frequency for the document.

10. Method according to claim 1, characterized in that the various storage means define a logical storage area for filing the documents, the logical storage area being divided into storage segments, the storage segments being defined by a start time and an end time and by the type of the document, and wherein the start time of the residence time is determined on filing of the first document file in the segment of the logical storage area or wherein the start time of the residence time is established between the start time and the end time of one of said storage segments.

11. Method according to claim 10, characterized in that the start time is determined by a program.

12. Method according to claim 1, characterized in that in the event of the first document file being accessed during the residence time, the residence time assigned to the first document file begins to run again or is determined afresh.

13. Method according to claim 1, characterized in that the relocating of the first document file from the first storage means to the second storage means is effected by the document management system or by a dedicated program.

14. Method according to claim 1, characterized in that the first document file is relocated from said first storage means to said second storage means singly or with all other documents for which the residence time has expired or in combination according to document type.

15. Method according to claim 1, characterized in that the first document file is filed separately as index data and content data, the index data and the content data being relocated individually or together to the second storage means on the expiration of the residence time.

16. Method according to claim 1, characterized in that the relocated first document file is "marked as relocated" and this information is filed in a document management system.

17. Method according to claim 1, characterized in that the method steps are performed by any one of the database or a separate system from the database.

18. Method according to claim 1, characterized in that the document is divided into index data and content data and different or identical residence times are assigned to the index data and the content data.

19. Method according to claim 1, characterized in that a search request for the first document file is interrupted if the first document file has been relocated or a process of recalling the first document file from the first storage means to the second storage means is already in progress.

20. Method according to claim 19, characterized in that interruption of the search request activates recalling of the first document file t if said recalling is not already in progress.

21. Method according to claim 20, characterized in that recalling the first document file for the search request is restricted to the index data.

22. A document file managing system in a data processing system, the system comprising:
    a computer system having a first storage means and a second storage means, wherein the computer system includes instructions to execute a method comprising:
        holding a first document file of a document comprising one or more document files, in the first storage means;
        determining a residence time (residual time) value wherein the residence time value is the time span between storage of the first document file in the second storage means and the time at which the first document file may be relocated to the first storage means;

assigning the residence time value to the first document file;

relocating the first document file to the second storage means wherein the time of relocating a document file to the second storage means marks the beginning of the residence time; and permitting the first document file to be moved from the second storage means after the expiration of the time span specified by the residence time value.

23. The system according to claim 22, wherein the second storage means is any one of a slower or lower-priced storage means than the first storage means.

24. The system according to claim 22, wherein the first storage means is a hard disk and the second storage means is a magnetic tape.

25. The system according to claim 22, wherein the first storage means is accessed directly.

26. The system according to claim 22, further comprising a second assignor for assigning a second residence time (keep time) wherein the second residence time is only activated on re-storage of the first document file in the first storage means from said second storage means.

27. The system according to claim 22, comprising the further step of recalling the first document file to the first storage means wherein either of the original residence time or a new residence time in the first storage system is assigned to the recalled first document file.

28. The system according to claim 22, wherein the residence time is stipulated in any one of within the first document file, within a description of the first document file type in the database, or within a file in the storage means.

29. The system according to claim 22, wherein the residence time is stipulated by any one of a user of the data processing system, by a user who files the document in the database, by a user who describes the type of document in the database, or by a program which calculates the residence time from the access frequency for the document.

30. The system according to claim 22, wherein the various storage means comprises a logical storage area for filing the documents, the logical storage area being divided into storage segments, the storage segments being defined by a start time and an end time and by the type of the first document file, and wherein the start time of the residence time is determined by filing of the first document file in the segment of the logical storage area or is established between the start time and the end time of one of said storage segments.

31. The system according to claim 22, wherein the residence time assigned to the first document file begins to run again or is determined afresh when the first document file is accessed during the residence time.

32. The system according to claim 22, further comprising the step of relocating the first document file from the first storage means to the second storage means wherein the manager comprises either a document management system or by a dedicated program.

33. The system according to claim 22, wherein the document is divided into index data and content data further comprising a second assignor for assigning residence times to either the index data or the content data.

34. A computer program product for managing document files in a data processing system, the computer program product comprising:

a storage medium readable by a processing circuit and storing instructions for execution by the processing circuit for performing a method comprising:

holding a first document file of a document comprising one or more document files, in a first storage means;

determining a residence time (residual time) value wherein the residence time value is the time span between storage of the first document file in a second storage means and the time at which the first document file may be relocated to the first storage means;

assigning the residence time value to the first document file;

relocating the first document file to the second storage means wherein the time of relocating a document file to the second storage means marks the beginning of the residence time; and permitting the first document file to be moved from the second storage means after the expiration of the time span specified by the residence time value.

35. The computer program product according to claim 34, wherein the second storage means is a slower or lower-priced storage means than the first storage means.

36. The computer program product according to claim 34, wherein the first storage means is a hard disk and the second storage means is a magnetic tape.

37. The computer program product according to claim 34, wherein the first storage means is accessed directly.

38. The computer program product according to claim 34, further comprising the step of assigning a second residence time (keep time) wherein the second residence time is only activated on re-storage of the document in the first storage means from said second storage means.

39. The computer program product according to claim 34, further comprising the step of recalling the first document file to the first storage means wherein either the original residence time or a new residence time in the first storage system is assigned to the recalled first document file.

40. The computer program product according to claim 34, wherein the residence time is stipulated in any one of within the first document file, within a description of the document type in the database, or within a file in the storage means.

41. The computer program product according to claim 34, wherein the residence time is stipulated by any one of a user of the data processing system, by a user who files the first document file in the database, by a user who describes the type of document in the database, or by computer readable computer code which calculates the residence time from the access frequency for the first document file.

42. The computer program product according to claim 34, wherein the various storage means comprises a logical storage area for filing the documents, the logical storage area being divided into storage segments, the storage segments being defined by a start time and an end time and by the type of the document, and wherein the start time of the residence time is determined by filing of the first document file in the segment of the logical storage area or is established between the start time and the end time of one of said storage segments.

43. The computer program product according to claim 34, wherein the residence time assigned to the first document file begins to run again or is determined afresh when the first document file is accessed during the residence time.

44. The computer program product according to claim 34, further comprising the step of relocating the first document file from the first storage means to the second storage means and comprises either a document management system or a dedicated program.

45. The computer program product according to claim 34, wherein the document is divided into index data and content data further comprising the step of assigning residence times to either the index data or the content data.

* * * * *